(12) United States Patent
Kennon

(10) Patent No.: US 7,413,440 B1
(45) Date of Patent: Aug. 19, 2008

(54) HUNDREDS BOARD DEVICE AND METHOD

(76) Inventor: Carol M. Kennon, P.O. Box 924, Elk Grove, CA (US) 95759-0924

(*) Notice: Subject to any disclaimer, the term of this patent is extended or adjusted under 35 U.S.C. 154(b) by 559 days.

(21) Appl. No.: 11/177,150

(22) Filed: Jul. 9, 2005

(51) Int. Cl.
*G09B 19/00* (2006.01)

(52) U.S. Cl. ......................... 434/207; 434/191

(58) Field of Classification Search ................ 434/188, 434/191, 198, 199, 202, 207, 209
See application file for complete search history.

(56) References Cited

U.S. PATENT DOCUMENTS

| | | | |
|---|---|---|---|
| 1,867,888 A | 7/1932 | Obidine | |
| 1,941,733 A | 1/1934 | Badanes | |
| 2,503,130 A | 4/1950 | Poritz | |
| 2,693,646 A | 11/1954 | Hawkins | |
| 2,991,564 A * | 7/1961 | Coleman | 434/205 |
| 3,339,288 A | 9/1967 | Sacks | |
| 3,432,943 A | 3/1969 | Merkel | |
| 3,435,541 A | 4/1969 | Tacey | |
| 3,491,460 A | 1/1970 | Novak | |
| 3,735,504 A * | 5/1973 | Fedyna | 434/199 |
| 4,015,345 A | 4/1977 | Rice, Jr. | |
| 4,196,529 A | 4/1980 | Esbensen | |
| 4,241,522 A | 12/1980 | Jablonski | |
| 4,445,865 A * | 5/1984 | Sellon | 434/207 |
| 4,674,433 A * | 6/1987 | Inada | 434/202 |
| 4,790,757 A * | 12/1988 | Takahashi | 434/209 |
| 4,915,634 A | 4/1990 | Hedden | |
| 6,079,983 A * | 6/2000 | Kane, Jr. | 434/209 |
| 6,513,708 B2 | 2/2003 | Evans | |
| 6,575,755 B2 * | 6/2003 | Dreyfous | 434/196 |
| 6,652,286 B1 | 11/2003 | Larsen | |
| 6,769,914 B2 * | 8/2004 | Sundararajan | 434/191 |
| 7,052,279 B1 * | 5/2006 | Losq | 434/191 |

* cited by examiner

*Primary Examiner*—Kurt Fernstrom

(57) ABSTRACT

Hundreds board device comprising a first member having thereon a series of consecutive natural numbers arranged in a ten by ten number array consecutively numbered from one through one hundred; a second member superimposed on the first member and including an array of windows registering with the numbers such that each of the windows has one of the numbers displayed therethrough; a first array of first colored transparent window slider covers horizontally slideably engaged relative to the first and second members for individually opening and closing each of the windows and a second array of second colored transparent window slider covers vertically slideably engaged relative to the first and second members for individually opening and closing each of the windows such that only one of the two colored transparent window slider covers is used at any one time to close any one window for teaching basic mathematical calculations and concepts.

14 Claims, 9 Drawing Sheets

One embodiment of the invention provides a method and computer readable medium having a program of the method recorded thereon causing, in use, a processor or computer running the program to execute a procedure for teaching basic mathematical calculations and/or concepts comprised of the steps including:

1) displaying a series of consecutive natural numbers arranged in a number array comprised of ten rows and ten columns consecutively numbered from left to right with natural numbers one through one hundred starting with natural number one in row one column one;

2) iteratively receiving user input in the form of a user selection of one of said natural numbers; and 3) highlighting each of said natural numbers in said number array in response to each user selection of one of said natural numbers for teaching basic mathematical calculations and/or concepts.

FIG. 14

HUNDREDS BOARD DEVICE AND METHOD

FIELD OF THE INVENTION

This invention relates generally to teaching devices and methods and, in particular, to a hundreds board device and method for teaching basic mathematical calculations and/or concepts.

BACKGROUND OF THE INVENTION

Over the years, teachers have employed a variety of mathematical calculation devices and methods for teaching lessons to their students in an attempt to increase the students' level of participation and for better facilitating the teaching process. For example, a systematic arrangement of numbered squares have been printed on paper or some other more durable surface in which teachers have students use crayons to color in the numbered squares to solve a math problem or to find a pattern. Coloring in the numbered squares typically limits this teaching device to a one time use and is both time consuming and laborious.

Alternatively, teachers have employed plastic chips to cover the numbered squares to solve a math problem or to find a pattern. This solution is problematic in that the chips are cumbersome to use by a young user, they get easily lost and played with by the young user, and sometimes the chips themselves become more engaging to the young user than the math concept being taught.

For the foregoing reasons, there is a need for a device and method for teaching basic mathematical calculations and/or concepts which overcomes the significant shortcomings of the known prior-art as delineated hereinabove.

BRIEF SUMMARY OF THE INVENTION

In one aspect, an embodiment of the invention provides a sliding hundreds board device and a method of using same comprising a first member having thereon a series of consecutive natural numbers from one through one hundred and a second member superimposed on the first member. The second member having an array of windows registering with the natural numbers such that each of the windows has one of the natural numbers displayed therethrough. The sliding hundreds board device further comprises first and second arrays of different colored transparent window slider covers slideably engaged between the first and second members and individually manipulated by, for example, one or more fingers of a user for opening and closing each of the windows wherein only one of the two different colored transparent window slider covers is manipulated at any one time to close any one window for teaching basic mathematical calculations and/or concepts.

In another aspect, an embodiment of the invention provides a hundreds board device comprising in combination: a display; a processor operatively coupled to the display for displaying on the display a series of consecutive natural numbers arranged in a number array comprised of ten rows and ten columns consecutively numbered with natural numbers one through one hundred starting with natural number one in row one, column one; and means for individually highlighting each of the natural numbers in the number array in response to a user selection for teaching basic mathematical calculations and/or concepts.

In another aspect, and in combination with the above hundreds board device, embodiments of the invention may further include highlighting means comprised of one or more of the following features: means for individually changing a color and/or background of each of the natural numbers in the number array in response to user selection; means for lighting up each number in response to user selection; and means for numbers to be identified through becoming audible in response to user selection such that numbers can be identified through changing color, lighting up, and/or becoming audible upon user selection.

In another aspect, and in combination with the above device, an embodiment of the invention may further comprise a hand-held housing for housing the display and processor within the housing.

In another aspect, and in combination with the above device, embodiments of the invention may further include user selection in the form of user touch or with a selection device such as a wand, keyboard, or mouse.

In another aspect, and in combination with the above device, embodiments of the invention may further include battery powered or solar panel powered devices for providing power thereto.

In another aspect, an embodiment of the invention provides a computer readable medium having a program recorded thereon in which the program causes, in use, a computer running the program to execute a procedure for teaching basic mathematical calculations and/or concepts comprised of the steps including: displaying on a display a series of consecutive natural numbers arranged in a number array comprised of ten rows and ten columns consecutively numbered with natural numbers one through one hundred starting with natural number one in row one column one; receiving user input in the form of a user selection of one of the natural numbers; and individually highlighting each of the natural numbers in the number array in response to each user selection of one of the natural numbers for teaching basic mathematical calculations and/or concepts.

Any type of computer readable medium may be employed and examples include floppy disks, conventional hard disks, CD-ROMS, Flash ROMS, nonvolatile ROM, and RAM.

In another aspect, an embodiment of the invention provides a computer readable medium having a program recorded thereon in which the program causes, in use, a computer running the program to execute a procedure for teaching basic mathematical calculations and/or concepts comprised of the steps including: displaying a series of consecutive natural numbers arranged in a number array comprised of ten rows and ten columns consecutively numbered with natural numbers one through one hundred starting with natural number one in row one column one; displaying an array of windows registering with the series of consecutive natural numbers such that each of the windows in the array of windows has one of the consecutive natural numbers displayed therethrough; displaying a first array of first colored transparent window slider covers user selectable for individually and horizontally sliding to open and close each of the windows in the array of windows; displaying a second array of second colored transparent window slider covers user selectable for individually and vertically sliding to open and close each of the windows in the array of windows; and sliding only one of the two colored transparent window slider covers at any one time to close any one window in the array of windows for teaching basic mathematical calculations.

Accordingly, and in one aspect, an embodiment of the invention provides a new, novel, and useful hundreds board device and method for teaching basic mathematical calculations and/or concepts including teaching an instant number identification concept through the sliding or highlighting concept of the hundreds board method.

Accordingly, it should be apparent that numerous modifications and adaptations may be resorted to without departing from the scope and fair meaning of the claims as set forth hereinbelow.

BRIEF DESCRIPTION OF THE DRAWINGS

FIG. 14 is a general flowchart of a hundreds board method.

DETAILED DESCRIPTION OF THE INVENTION

Figure 1:
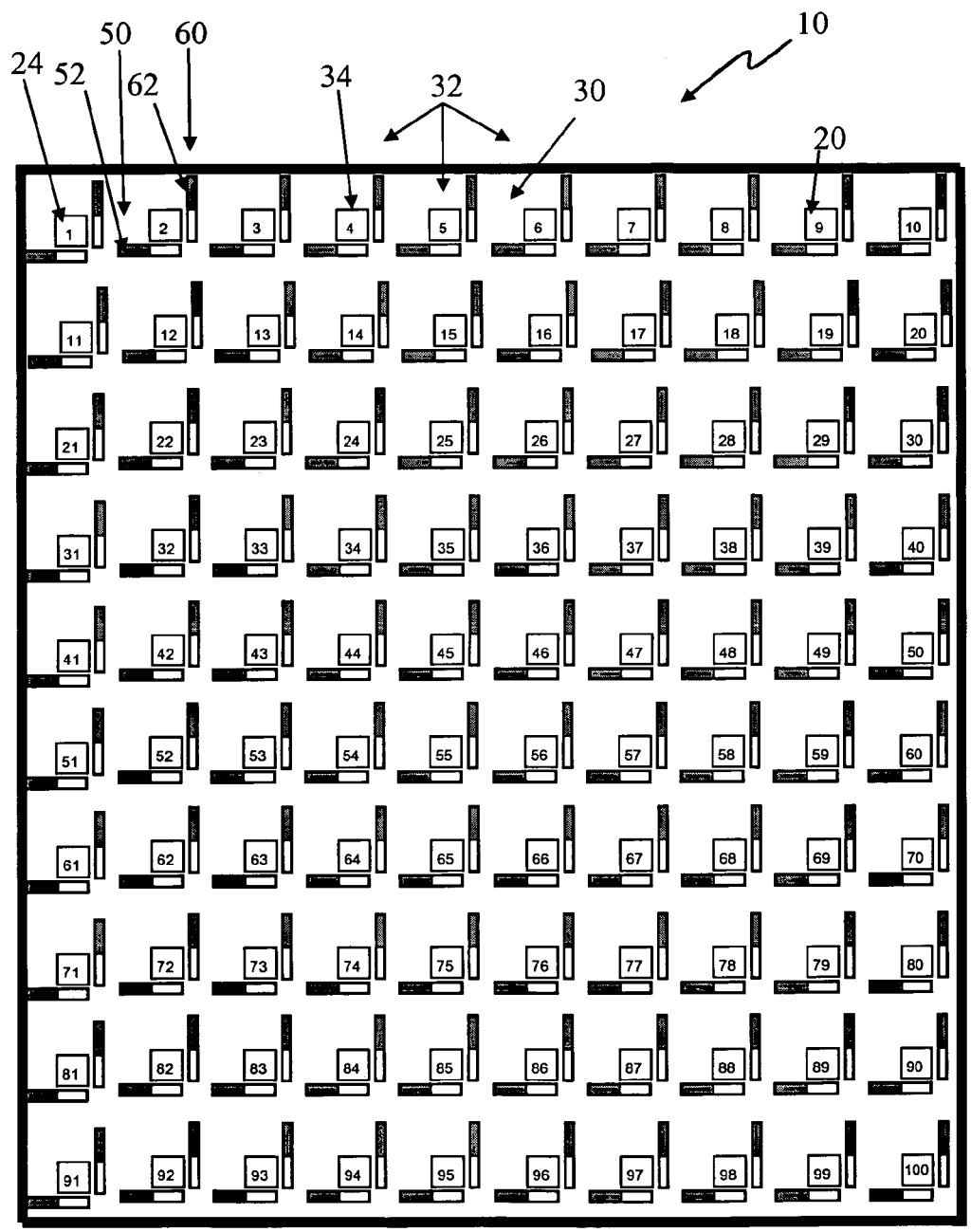
FIG. 1 is a front perspective view of a hundreds board device.

Considering the drawings, like reference numerals denote like parts throughout the various drawing figures.

Referring to FIGS. 1 through 4, and in general, an embodiment of the invention provides a sliding hundreds board device 10 and method of using same comprising a first lower or bottom member 20 (FIG. 3) having thereon a series of consecutive natural numbers 24 consecutively numbered from left to right with natural numbers one through one hundred starting with natural number one in row one column one and a second upper or top member 30 (FIG. 2) superimposed on the first member 20 and having an array 32 of windows 34 registering with the natural numbers 24 such that each of the windows 34 has one of the natural numbers 24 from one through one hundred displayed therethrough (FIG. 1). The sliding hundreds board device 10 further comprises first and second arrays 50, 60 of different colored transparent window slider covers 52, 62 slideably engaged relative to the first and second members 20, 30 and individually manipulated for opening or closing each of the windows 34 for uncovering or covering each natural number 24 displayed therethrough with either of the different colored transparent window slider covers 52, 62 wherein only one of the two different colored transparent window slider covers 52, 62 is manipulated at any one time to close any one window 34 for teaching basic mathematical calculations.

Figure 3:
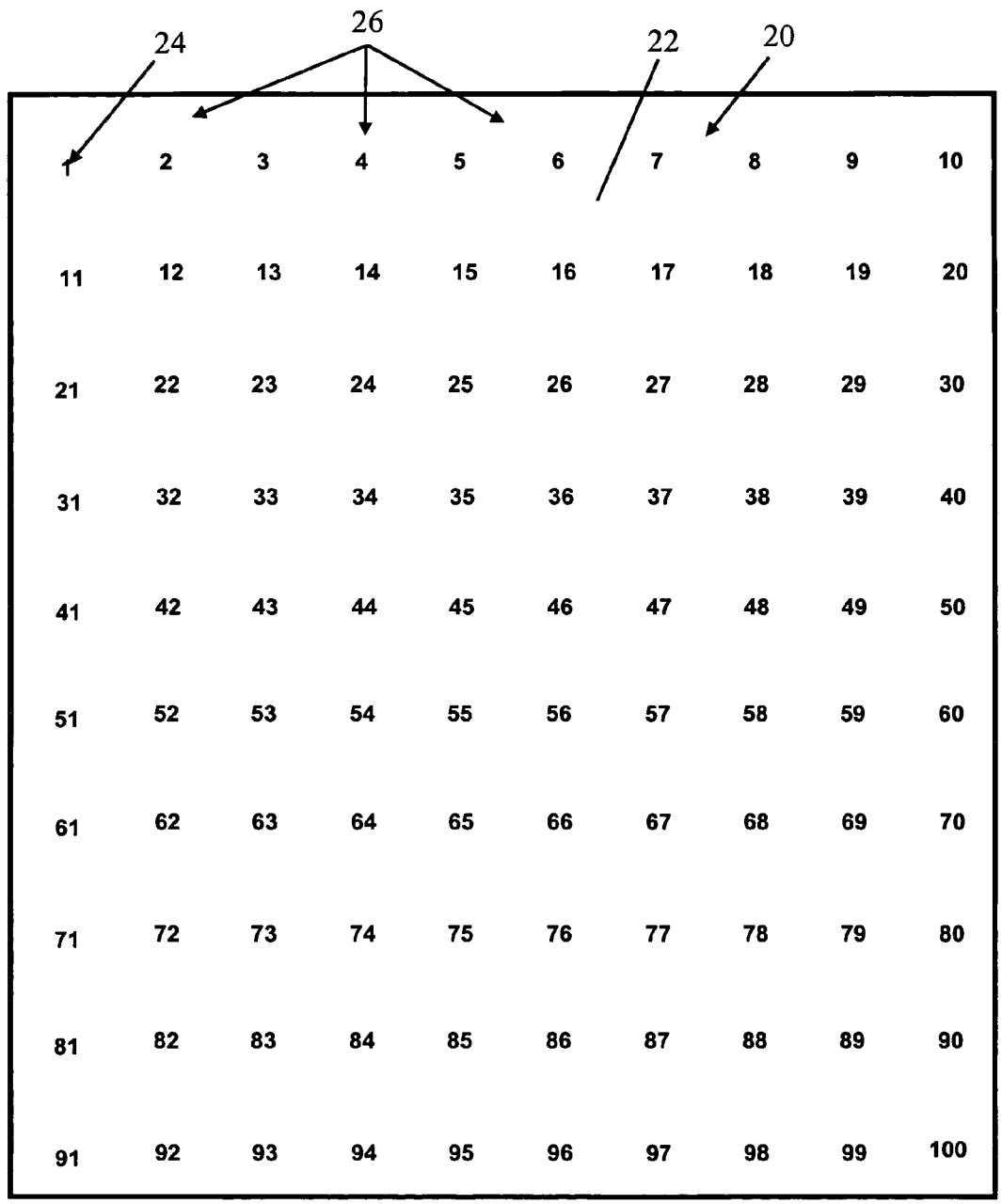
FIG. 3 is a front perspective view of a bottom member of the hundreds board device shown in FIG. 1.

More specifically, FIG. 3 illustrates one embodiment of the first lower or bottom member 20 as a first substantially planar rectangular member 20 having a front face 22 having printed thereon, preferably in a bold face type, the series of consecutive natural numbers 24 ranging from one through one hundred and arranged in a number array 26 comprised of ten rows and ten columns consecutively numbered from left to right with natural numbers one through one hundred starting with natural number one in row one column as illustrated in FIG. 3.

In one embodiment, the first member 20 is formed of quarter inch thick cardboard having a length of approximately between fourteen to sixteen inches and a width of approximately twelve inches and having windows cut out or disposed therein having a length of one half of an inch and a width of one half of an inch. Additionally, the first member 20 can take on other shapes and be formed of other materials such plastic, metal, or a combination of materials.

As an alternative, the first member 20 can be formed of plastic. Additionally, a metal or a combination of materials may be used to form the first member 20.

Moreover, and in one embodiment of the invention the first member 20 can be formed as a transparency such that the device 10 can be employed with an over head projector for teaching basic mathematical calculations.

Figure 2:
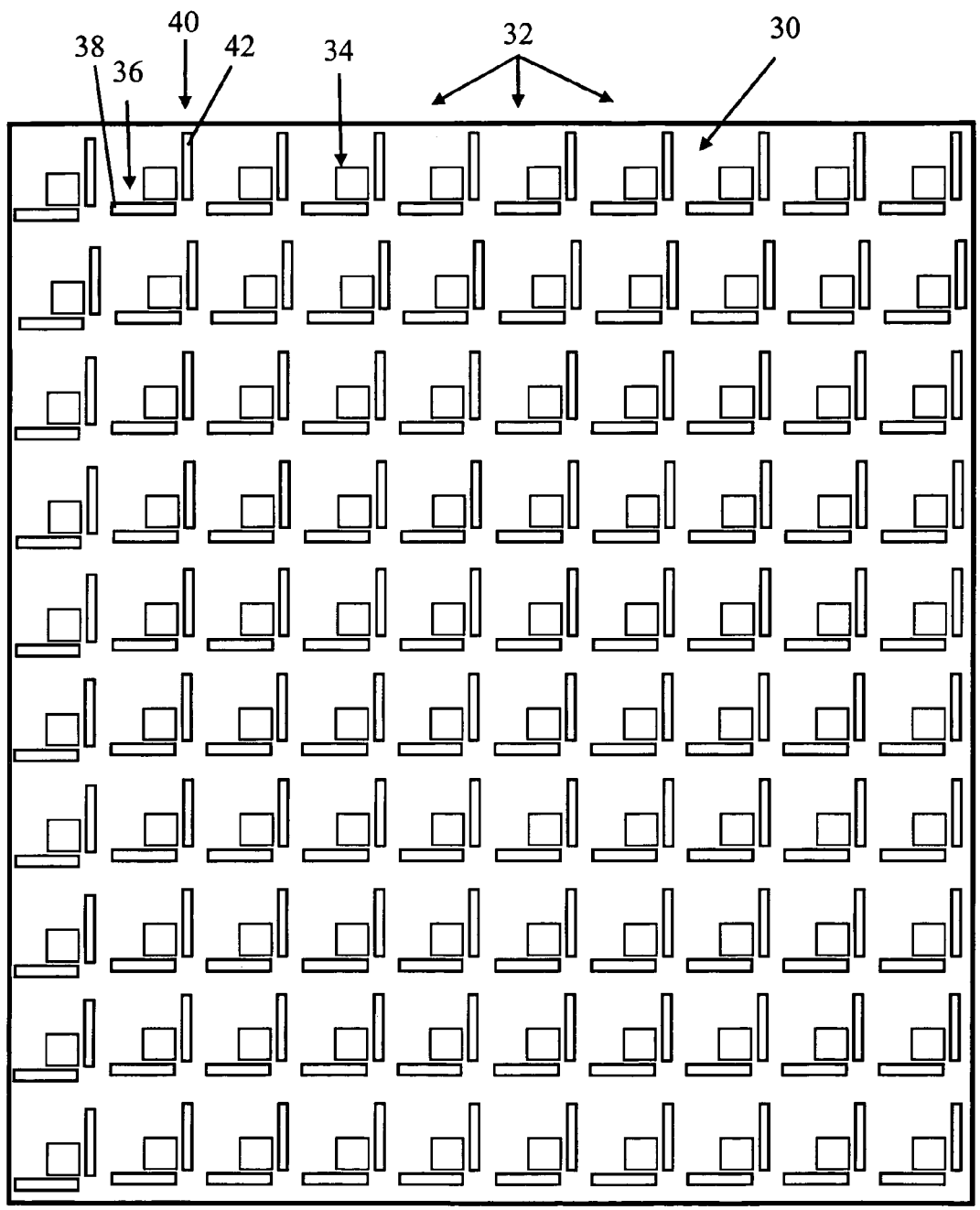
FIG. 2 is a front perspective view of a top member of the hundreds board device shown in FIG. 1.

Referring to FIGS. 1 and 2, the sliding hundreds board device 10 is further comprised of the second member 30 superimposed on the first member 20.

FIG. 2 illustrates one embodiment of the second upper or top member 30 as a second substantially planar rectangular member 30 comprising an array 32 of windows 34 registering with the series of consecutive natural numbers 24 as illustrated in FIG. 1 such that each of the windows 34 in the array of windows 32 has one of the consecutive natural numbers 24 displayed therethrough.

In one embodiment, the second upper or top member 30 or the substantially planar rectangular member 30 is formed of quarter inch thick cardboard having a length of approximately between fourteen to sixteen inches and a width of approximately twelve inches. Additionally, the second member 30 can take on other shapes and be formed of other materials such plastic, metal, or a combination of materials.

Furthermore, and in one embodiment, the second member 30 is superimposed on the first member 20 and held thereto preferably by adhesive. Alternatively, clips, fasteners, folding tabs, or other coupling means may be used to hold the two members 20 and 30 together.

Referring to FIG. 2, the second member 30 further includes an array 36 of horizontal slots 38 disposed below the array 32 of windows 34 such that each horizontal slot 38 is disposed below each of the windows 34 in the array of windows 32.

In one embodiment, each horizontal slot 38 is formed by an approximately one inch long by one quarter inch wide horizontal opening disposed there eights of an inch below each of the windows 34 with approximately half of the length of each horizontal slot 38 running the width of each window 34 and with approximately the other half of the length of each horizontal slot 38 running to the left of each window 34.

The second member 30 further includes an array 40 of vertical slots 42 disposed to the right of the array 32 of windows 34 such that each vertical slot 42 is disposed to the right of each of the windows 34 in the array of windows 32.

In one embodiment, each vertical slot 42 is formed by an approximately one inch long by one quarter inch wide vertical opening disposed approximately one eight of inch to the right of each of the windows 34 with approximately half of the length of each vertical slot 42 running the vertical height of each window 34 and with approximately the other half of the length of each vertical slot 42 running to a height above each window 34.

Figure 4:
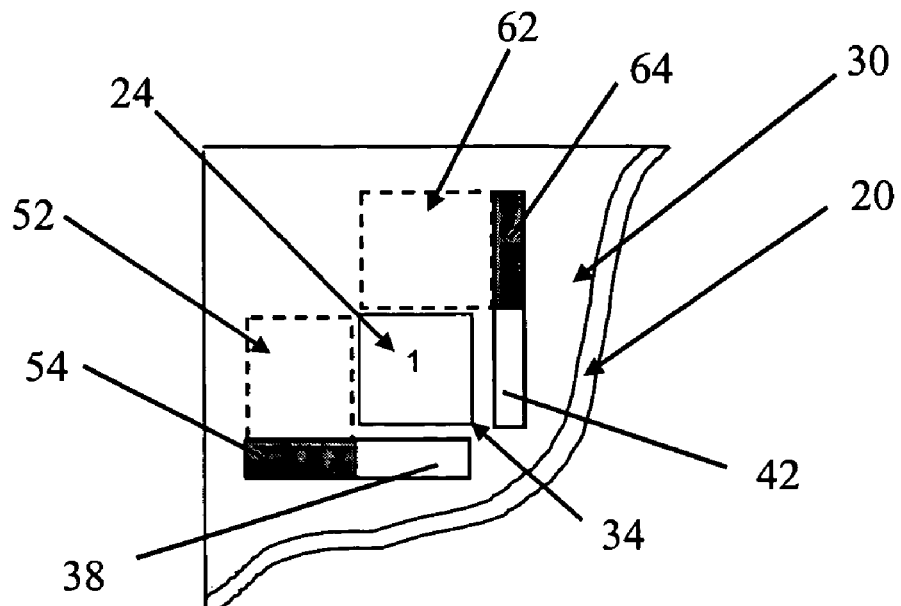
FIG. 4 is a partially fragmented front perspective view of the hundreds board device shown in FIG. 1.
Figure 5:
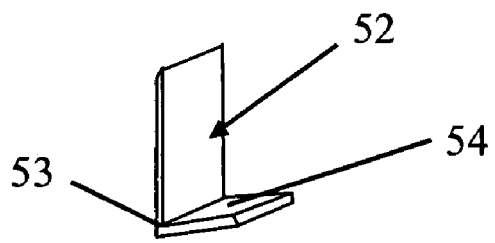
FIG. 5 is a side perspective view of a horizontal tab of the hundreds board device shown in FIG. 1.

Turning now to FIGS. 1, 4, and 5, the sliding hundreds board device 10 is further comprised of the first array 50 of substantially planar first colored transparent window slider covers 52 each terminating at one end 53 to an upwardly extending tab 54 which, from a back side of the second member 30, threads through one of the horizontal slots 38 formed in the second member 30 and extends beyond a front face thereof at a location adjacent the bottom of each of the windows 34 such that each of the substantially planar first colored transparent window slider covers 52 in the first array 50 are individually and horizontally engaged between the first and second members 20, 30 and horizontally slideable within horizontal slots 38 by a left to right manual manipulation of each of the upwardly extending tabs 54 to individually and selectively cover each of the windows 34 in the array of windows 32 with one of the substantially planar first colored transparent window slider covers 52 included in the first array 50 and a right to left manual manipulation of each of the upwardly extending tabs 54 to individually and selectively uncover each of the covered windows 34 in the array of windows 32.

Figure 6:
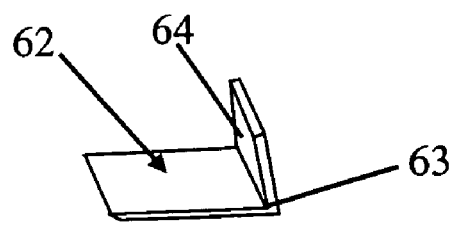
FIG. 6 is a side perspective view of a vertical tab of the hundreds board device shown in FIG. 1.

Turning now to FIGS. 1, 4, and 6, the sliding hundreds board device 10 is further comprised of the second array 60 of substantially planar second colored transparent window slider covers 62 each terminating at one end 63 to an upwardly extending tab 64 which, from a back side of the second member 30, threads through one of the vertical slots 42 formed in the second member 30 and extends beyond a front face thereof at a location adjacent the right side of each of the windows 34 such that each of the substantially planar second colored transparent window slider covers 62 in the second array 60 are individually and vertically engaged between the first and second members 20, 30 and vertically slideable within vertical slots 42 by up to down manual manipulation of each of the upwardly extending tabs 64 to individually and selectively cover each of the windows 34 in the array of windows 32 with one of the substantially planar second colored transparent window slider covers 62 included in the first array 60 and a down to up manual manipulation of each of the upwardly extending tabs 64 to individually and selectively uncover each of the covered windows 34 in the array of windows 32 such that only one of the two colored transparent window slider covers 52, 62 is used at any one time to close any one window 34 in the array of windows 32 for teaching basic mathematical calculations.

In one embodiment, the first array of substantially planar transparent colored window slider covers 52 are formed from green transparent plastic approximately one half an inch wide by approximately one half inch in length and terminating at one end to an approximately one quarter to one half inch tall or upwardly extending tab 54. Additionally, and one embodiment, the second array of substantially planar transparent colored window covers 62 are formed from red transparent plastic approximately one half an inch wide by approximately one half inch in length and terminating at one end to an approximately one quarter to one half inch tall or upwardly extending tab 64.

In use and operation, and referring to FIGS. 1 through 11, the sliding hundreds board device 10 can be placed in use by first opening all of the windows and then performing a basic mathematical calculation as illustrated in FIGS. 7 through 11.

Figure 7:
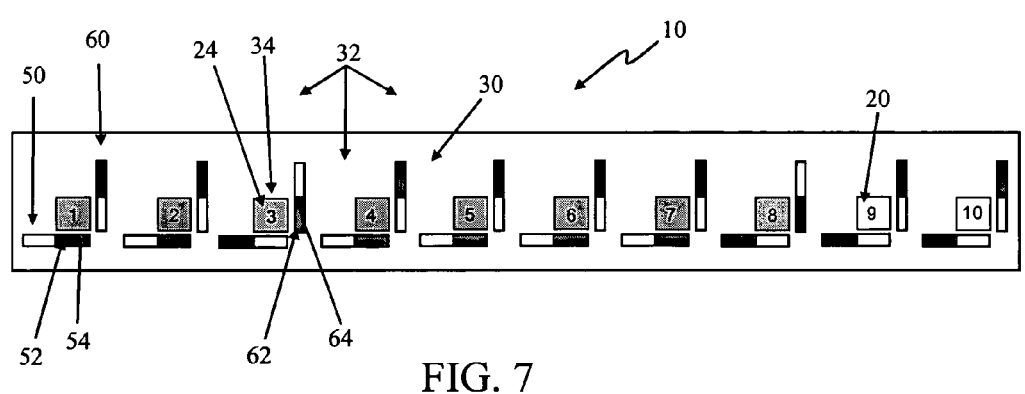
FIG. 7 is a partially fragmented front perspective view of the first row of the hundreds board device shown in FIG. 1 for demonstrating addition.

For example, and referring to FIGS. 1 and 7, an addition calculation of a first natural number to a second natural number includes the steps of closing a first window displaying natural number one in row one, column one, with a first colored transparent window slider cover 52 by a left to right manual manipulation of associated tab 54 and covering sequential numbers by closing sequential windows thereafter with first colored transparent window covers 52 by left to right manual manipulation of associated tabs 54 for sequentially closing one window for each addition of one needed to obtain the first natural number with the exception of closing the last window for the final addition of one needed to obtain the first natural number which is marked by closing the last window with a second colored transparent window slider cover 62 by downward manual manipulation of associated tab 64 and then continuing to cover sequential numbers by closing sequential windows with one of the first colored transparent window slider covers 52 by left to right manual manipulation of associated tabs 54 for each counting of one needed to obtain the second natural number with the exception of closing the last window for the final addition of one needed to obtain the second natural number which is marked by closing the last window with a second colored transparent window slider cover 62 by downward manual manipulation of associated tab 64 such that the natural number transparently covered thereby provides the answer to the addition of the first and second natural numbers.

FIG. 7 shows the procedure and concept of adding a set of 3 to a set of 5 to obtain a set of 8 by manual manipulation of sliders 52, 62.

Hence, the device 10 is used for teaching mathematical concepts exemplified by the addition of the first natural number three with the second natural number five wherein a user moves a first colored transparent window slider cover 52 using tab 54 from left to right closing the number one window and counts one. Next, the user moves a subsequent first colored transparent window slider cover 52 from left to right closing the number two window and counts two. Since three is the last number in the set of three the user, at three, slides a second colored transparent window slider cover 62 down using tab 64 closing window three and counts three. Next, the user repeats this process closes the fourth window with a first colored transparent window slider cover 52 using tab 54 from left to right closing the number four window and counts one. Next, the user moves subsequent first colored transparent window slider covers 52 using tabs 54 from left to right closing the number five, six, seven windows and respectively counts 2, 3, and 4. Since five is the last number in the set of five the user, at count five, slides a second colored transparent window slider cover 62 down using tab 64 such that the natural number transparently covered thereby provides the answer to the addition of the first and second natural numbers which in this case is equal to eight.

Moreover, the device 10 is used for teaching mathematical concepts exemplified by subtraction, multiplication, and division wherein a user closes a window by moving either a first colored transparent window slider cover 52 using tab 54 from left to right or by moving a second different colored transparent window slider cover 62 down using tab 64 such that only one of the two different colored transparent window slider covers 52, 62 is manipulated by way of respective tabs 54, 64 at any one time to close any one window 34 for teaching basic mathematical calculations and/or concepts.

Figure 8:
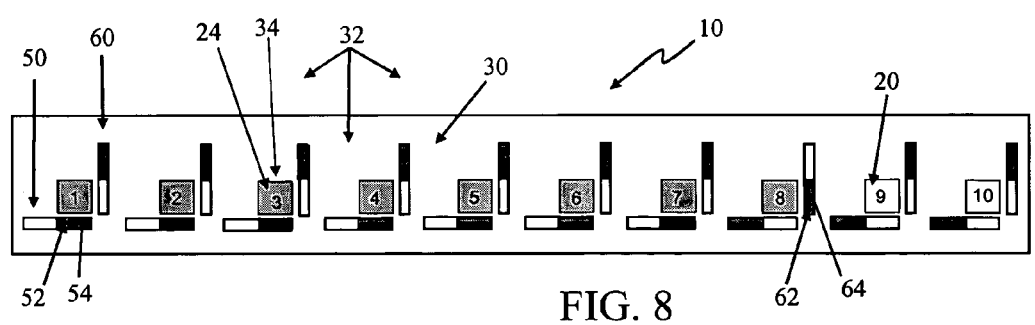
FIG. 8 is a partially fragmented front perspective view of the first row of the hundreds board device shown in FIG. 1 for demonstrating subtraction in combination with FIG. 9.
Figure 9:
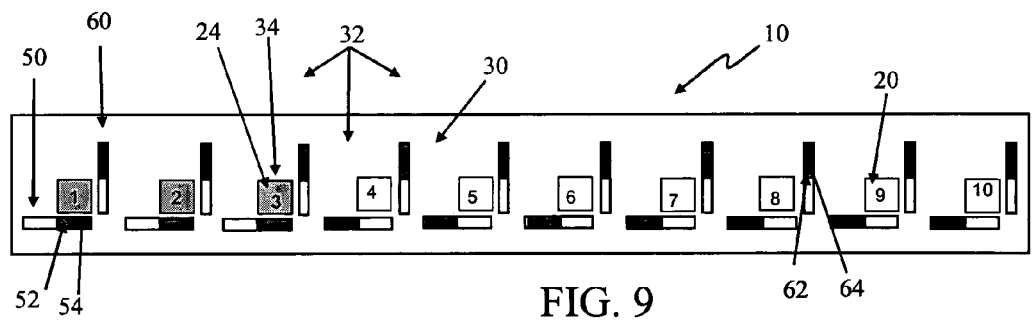
FIG. 9 is a partially fragmented front perspective view of the first row of the hundreds board device shown in FIG. 1 for demonstrating subtraction in combination with FIG. 8.

Now referring to FIG. 8, and for example, the device 10 can be placed in use by first opening all of the windows and then performing a basic subtraction calculation of a second smaller natural number Y from a first larger natural number X by performing the following steps: closing a first window displaying natural number one in row one, column one, with a first colored transparent window slider cover 52 by a left to right manual manipulation of associated tab 54 and covering sequential numbers by closing sequential windows thereafter with first colored transparent window slider covers 52 by left to right manual manipulation of associated tabs 54 for sequentially closing one window, starting from the first window, with one first colored transparent window slider cover 52 for each addition of one needed to obtain the first larger natural number X with the exception of closing the last window for the final addition of one needed to obtain the first larger natural number X which is marked by the closing the last window with a second colored transparent window cover 62 by downward manual manipulation of associated tab 64 and then, referring to FIG. 9, working backwards by sequentially opening one of the closed windows for each addition of one needed to obtain the second smaller natural number Y starting with the opening of the second colored transparent window cover 62 for the first one needed to obtain the second smaller natural number Y by upward manual manipulation of associated tab 64 and working backwards by sequentially opening one of the closed windows covered by one first colored transparent window slider cover 52 by left to right manual manipulation of associated tab 54 for each further addition of one needed to obtain the second smaller natural number Y such that that the transparently covered natural number immediately after the last opened window 34 reveals the answer to the subtraction calculation of the second smaller natural number from the first larger natural number. FIGS. 8 and 9 illustrate a method and concept of counting out a set of 8 and subtracting a set of 5 to obtain a set of 3 by manual manipulation of sliders 52, 62.

Figure 10:
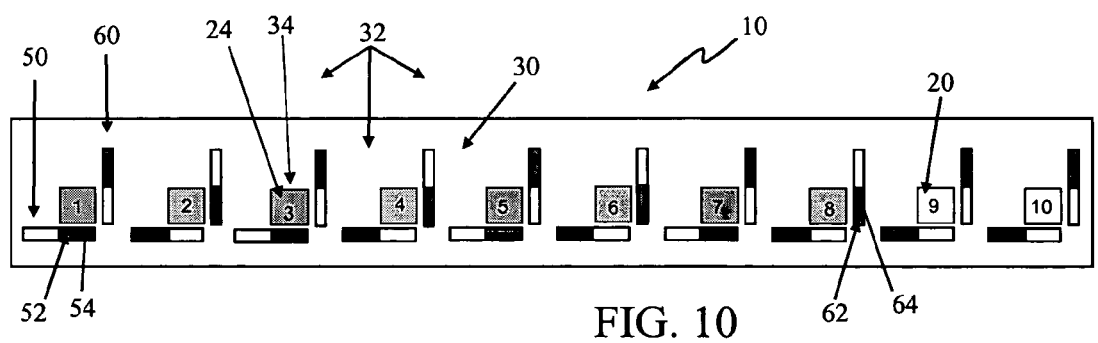
FIG. 10 is a partially fragmented front perspective view of the first row of the hundreds board device shown in FIG. 1 for demonstrating multiplication.

Referring to FIG. 10, and for example, the device 10 can be placed in use by first opening all of the windows and then performing a basic multiplication calculation of a first natural number which may be designated by X by a second natural number which may be designated by Y by performing the following steps: closing a first window displaying natural number one in row one, column one, with a first colored transparent window slider cover 52 by a left to right manual manipulation of associated tab 54 and covering sequential numbers by closing sequential windows thereafter with first colored transparent window slider covers 52 by left to right manual manipulation of associated tabs 54 for sequentially closing one window, starting from the first window, for each addition of one needed to obtain the first natural number with the exception of closing the last window for the final addition of one needed to obtain the first natural number which is marked by the closing of the last window with a second colored transparent window slider cover 62 by downward manual manipulation of associated tab 64 and then repeating this process on consecutive windows a number of times equal to the second natural number such that that the transparently covered natural number displayed through the last closed window after the second natural number of times reveals the answer to the multiplication calculation of the first natural number by the second natural number.

FIG. 10 illustrates the method and concept of multiplying a set of 2 by a set of 4 by repeating the process of closing a set of two window four times to obtain a set of 8 by manual manipulation of sliders 52, 62.

Figure 11:
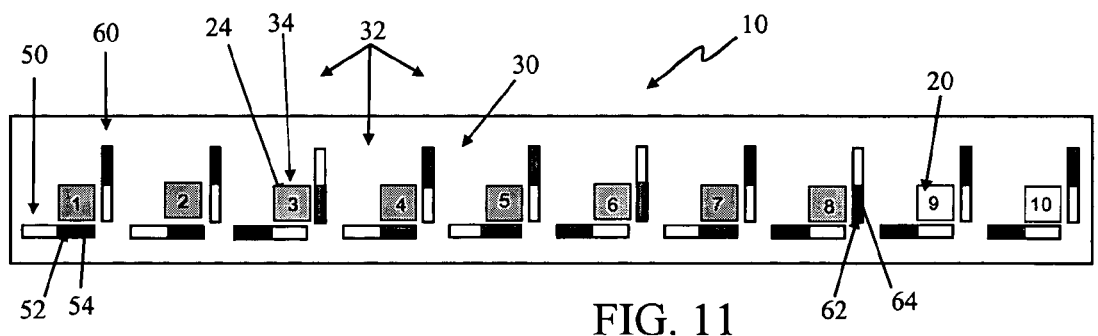
FIG. 11 is a partially fragmented front perspective view of the first row of the hundreds board device shown in FIG. 1 for demonstrating division.

Referring to FIG. 11, and for example, the device 10 can be placed in use by first opening all of the windows and then performing a basic division calculation of a first larger number by a second smaller number by carrying out a method of comprising the following steps: closing a second colored window covering the natural number representing the first larger number and then closing a first window displaying natural number one in row one, column one, with a first colored transparent window slider cover 52 by a left to right manual manipulation of associated tab 54 and covering sequential numbers by closing sequential windows thereafter with first colored transparent window slider covers 52 by left to right manual manipulation of associated tabs 54 for sequentially closing one window, starting from the first window, for each addition of one needed to obtain the second smaller number with the exception of closing the last window for the final addition of one needed to obtain the second smaller number which is marked by the closing of the last window with a second colored transparent window slider cover 62 by downward manual manipulation of associated tab 64 and then repeating this process on consecutive windows without a group of ones in the second smaller number going beyond the second colored transparent window slider cover 62 covering the first larger number and then counting the number of the second colored transparent window slider covers 62 which have been closed without going beyond the second colored transparent window slider cover 62 covering the first larger number for obtaining the number of groups of the second smaller number that are in the first larger number and then obtaining any remainder by counting windows needed to go from a last closed second colored transparent window slider cover 62 to the second colored transparent window slider cover 62 covering the first larger number and including the second colored transparent window slider cover 62 covering the first larger number.

FIG. 11 shows one specific example of the method and concept of dividing a first larger set such as number eight by a second smaller set such as number three by manual manipulation of sliders 52, 62 such that it is revealed that there are two groups of three in eight with a remainder of two left over.

Figure 12:
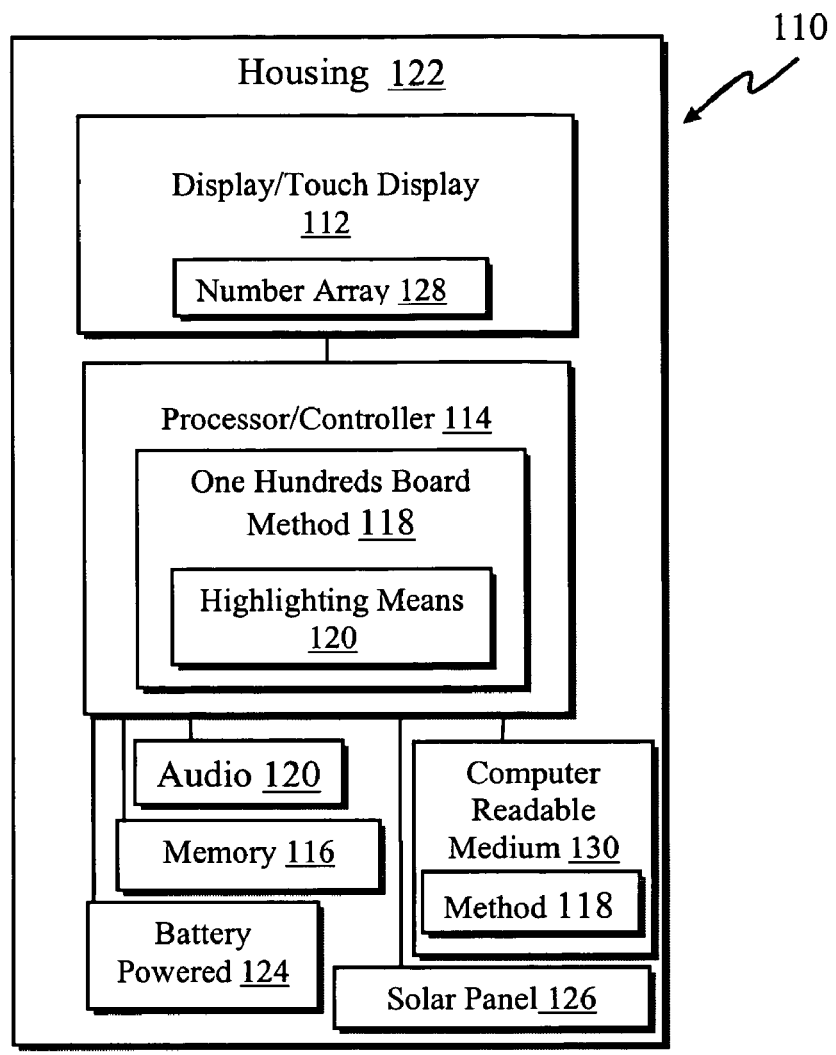
FIG. 12 is a front perspective view of a hundreds board device.

Referring to FIG. 12, and in another aspect, an embodiment of the invention provides a hundreds board device 110 comprising in combination: a display 112; a processor/controller 114 electrically or operatively coupled to both an associated memory 116 and to the display 112 for displaying, in accordance with a one hundreds board method 118, on the display a series of consecutive natural numbers or numbered squares arranged in a number array 128 comprised of ten rows and ten columns consecutively numbered with natural numbers one through one hundred starting with natural number one in row one column one; and means 120 for individually highlighting each of the natural numbers in the number array 128 in response to a user selection for use in teaching basic mathematical calculations and/or concepts.

In another aspect, and in combination with the above device 110, embodiments of the invention may further include highlighting means 120 comprised of one or more of the following features: means for individually changing a color and/or background of each of the natural numbers or numbered squares in the number array 128 in response to user selection; means for lighting up each natural number or numbered square in response to user selection; and means for natural numbers or numbered squares to be identified through becoming audible by way of audio device 120 electrically connected to the processor/controller 114 in response to user selection such that numbers can be identified through changing color, lighting up, and/or becoming audible upon user selection.

In another aspect, and in combination with the above device 110, embodiments of the invention may further include a touch screen display 112 for user selection input in the form of user touch or input by way of a selection device such as a wand or wand like instrumentality. User selection may also be accomplished using a keyboard 136 and/or mouse 138 operatively coupled to processor/controller 114.

In another aspect, and in combination with the above device 110, an embodiment of the invention may further comprise a hand-held housing 122 for housing the display 112 and processor/controller 114 within the housing 122.

In another aspect, and in combination with the above device 110, embodiments of the invention may further include a battery powered device 124, or solar panel device 126 electrically connected to the processor/controller 114 and any further power consuming components such as display 112 and memory 116 as required for providing power thereto.

Figure 13:
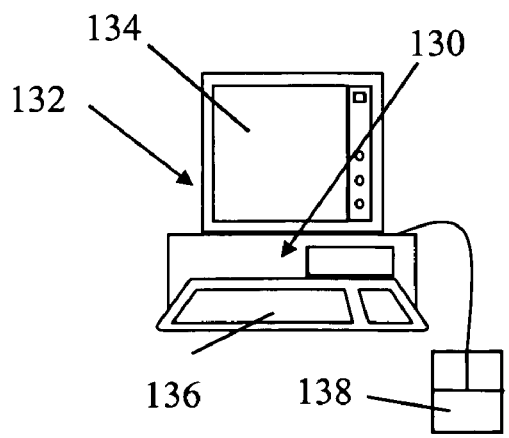
FIG. 13 is a front perspective view of a computer employing the hundreds board device and method.

Referring to FIG. 13, and in another aspect, an embodiment of the invention provides a hundreds board device 110 embodied in a notebook computer, desktop computer, networked computer, or the like one of which is exemplified by a computer 132 comprised of a display 134 for displaying, in accordance with the one hundreds board method 118, on the display on the display 134 a series of consecutive natural numbers arranged in a number array 128 comprised of ten rows and ten columns consecutively numbered with natural numbers one through one hundred starting with natural number one in row one column one; and means 120 for individually highlighting each of the natural numbers in the number array in response to a user selection for teaching basic mathematical calculations and/or concepts.

Display 134 can be a touch screen display for user selection input in the form of user touch or with a selection device such as a wand or wand like instrumentality. User selection may also be accomplished using keyboard 136 and/or mouse 138.

Referring to FIGS. 13 and 14, and in another aspect, an embodiment of the invention provides the hundreds board method 118 and a computer readable medium 130 having a program of the hundreds board method 118 recorded thereon in which the program causes, in use, device 110 or a computer 130 running the program to execute a hundreds board method 118 for teaching basic mathematical calculations and/or concepts comprised of the steps including: displaying a series of consecutive natural numbers or numbered squares arranged in a number array comprised of ten rows and ten columns consecutively numbered with natural numbers one through one hundred starting with natural number one in row one column one; receiving user input in the form of a user selection of one of the natural numbers; and individually highlighting each of the natural numbers in the number array in response to each user selection of one of the natural numbers for teaching basic mathematical calculations or concepts as exemplified above in the delineation of use and operation.

In another aspect, an embodiment of the invention provides a hundreds board method 128 and a computer readable medium 130 having the program of the hundreds board method 118 recorded thereon in which the program causes, in use, a computer running the program to execute a procedure for teaching basic mathematical calculations and/or concepts comprised of the steps including: displaying a series of consecutive natural numbers arranged in a number array comprised of ten rows and ten columns consecutively numbered with natural numbers one through one hundred starting with natural number one in row one column one; displaying an array of windows registering with the series of consecutive natural numbers such that each of the windows in the array of windows has one of the consecutive natural numbers displayed therethrough; displaying a first array of first colored transparent window slider covers user selectable for individually and horizontally sliding to open and close each of the windows in the array of windows; proving a second array of second colored transparent window slider covers user selectable for individually and vertically sliding to open and close each of the windows in the array of windows; and sliding only one of the two colored transparent window slider covers at any one time to close any one window in the array of windows for teaching basic mathematical calculations or concepts as exemplified above in the delineation of use and operation.

Accordingly, and in one aspect, an embodiment of the invention provides a new, novel, and useful hundreds board device and method 10, 110 for teaching basic mathematical calculations and/or concepts.

Accordingly, and in one aspect, an embodiment of the invention provides a new, novel, and useful hundreds board device and method 10, 110 for teaching an instant number identification concept through the sliding or highlighting method of the hundreds board 10, 110.

In another aspect, an embodiment of invention provides a hundreds board device which is a manipulative that will help engage young minds to solve a given math task in less time, instead of using the time consuming coloring method or use of chips to identify the designated numbers on the board.

In one aspect, an embodiment of the invention provides an advantage of allowing an instructor and student to complete lessons and assignments more quickly, thereby making time for additional practice which will translate to faster mastery of math facts and concepts.

In another aspect, an embodiment of the invention provides an advantage of being able to be sized large enough for whole class instruction or sized for individual use such that each child has own device to manipulate.

In another aspect, an embodiment of the invention provides an advantage of being able to be sized for shared use.

In another aspect, an embodiment of the invention provides an advantage of providing an overhead hundreds board device for use with an overhead projector to be seen by small or large groups.

In another aspect, an embodiment of the invention provides an advantage of providing a hundreds board device which is easy to explain its function and usage in solving problems on it.

In another aspect, an embodiment of the invention provides an advantage of allowing students to verbalize a math concept while demonstrating the concept on the hundreds board device.

In another aspect, an embodiment of the invention provides an advantage of allowing students to write about math discoveries they may have found on their own by experimenting with the hundreds board device.

In another aspect, an embodiment of the invention provides an advantage of allowing students to use the hundreds board device for a variety of math programs.

In another aspect, an embodiment of the invention provides an advantage of allowing students to take home the hundreds board device for completing math homework assignments and/or practice.

In another aspect, an embodiment of the invention provides an advantage of allowing a tutor to use the hundreds board device as a great teaching tool.

In another aspect, an embodiment of the invention provides a sliding hundreds board device 10 having easy accessibility to students and teachers (no plugs, cords, chips, color crayons, or batteries).

In another aspect, an embodiment of the invention provides a hundreds board device having easy portability.

In another aspect, an embodiment of the invention provides a hundreds board device in eye catching primary colors (yellow, red, green).

In another aspect, an embodiment of the invention provides a hundreds board device which provides one or more users an entire visualization of sequence of numbers and their interrelationship to one another.

In another aspect, an embodiment of the invention provides a hundreds board device numbered from one to N wherein N is equal to a natural number greater than one or less than one Moreover, it should be apparent that numerous structural modifications and adaptations may be resorted to without departing from the scope and fair meaning of the present invention as set forth hereinabove and as described herein below by the claims.

I claim:

1. A teaching device, said teaching device comprising in combination:
    a first member having thereon a sequential series of integers arranged in rows and columns;
    a second member superimposed on said first member and including an array of windows registering with said sequential series of integers such that each of said windows has one of said series of integers displayed therethrough; and
    an array of transparent window slider covers slideably engaged relative to said first and second members such that each of said transparent window slider covers are individually slideable to individually open and close each of said windows in said array of windows for teaching basic mathematical calculations and concepts.

2. The combination of claim 1 wherein said sequential series of integers comprises consecutive natural numbers from one through one hundred sequentially arranged in a number array comprised of ten rows and ten columns and wherein said array of windows is comprised of a ten by ten window array comprised of ten rows and ten columns of windows registering with said ten by ten number array such that each of said windows in said window array has one of said consecutive natural numbers displayed therethrough.

3. The combination of claim 2 wherein said array of transparent window slider covers includes a first array of substantially planar first colored transparent window slider covers and a second array of substantially planar second colored transparent window slider covers slideably engaged relative to the first and second members and individually manipulated for opening and closing each of the windows with either of said first or said second colored transparent window slider covers wherein only one of the two colored transparent window slider covers is manipulated at any one time to close or open any one window for teaching basic mathematical calculations and concepts.

4. The combination of claim 3 wherein each of said first colored transparent window slider covers terminates at one end to an upwardly extending horizontal tab threaded, from a back end of said second member, through a horizontal slot formed in said second member at a location adjacent a bottom of each of said windows such that each of said first colored transparent window slider covers are individually and horizontally slideable by respective manual manipulation of each of said horizontal tabs to individually and selectively close and open each of said windows in said array of windows with one of said substantially planar first colored transparent window slider covers included in said first array.

5. The combination of claim 4 wherein each of said second colored transparent window slider covers terminates at one end to an upwardly extending vertical tab threaded, from the back end of said second member, through a vertical slot formed in said second member at a location adjacent one side of each of said windows such that each of said second colored transparent window slider covers are individually and vertically slideable by respective manual manipulation of each of said vertical tabs to individually and selectively close and open each of said windows in said array of windows with one of said substantially planar second colored transparent window slider covers included in said second array wherein either one vertical tab or one horizontal tab is manipulated at any one time to close or open any one window for teaching basic mathematical calculations and concepts.

6. The combination of claim 5 wherein said first array of substantially planar first colored transparent window slider covers are formed from transparent green plastic and wherein said second array of substantially planar second colored transparent window slider covers are formed from transparent red plastic.

7. The combination of claim 6 wherein said first member and said second member are both substantially planner and formed from one or more materials from a group comprising heavy weight paper, cardboard, plastic and metal.

8. A hundreds board device, said device comprising in combination:
    a first substantially planar member having thereon a series of consecutive natural numbers arranged in a number array comprised of ten rows and ten columns consecutively numbered with natural numbers one through one hundred starting with natural number one in row one column one;
    a second member superimposed on said first member and attached thereto and comprised of an array of windows registering with said series of consecutive natural numbers such that each of said windows in said array of windows has one of said consecutive natural numbers displayed therethrough;
    a first array of first colored transparent window slider covers horizontally slideably engaged between said first and second members such that each of said first colored transparent window slider covers are individually and horizontally slideable to individually open and close each of said windows in said array of windows; and
    a second array of second colored transparent window slider covers vertically slideably engaged between said first and second members such that each of said second colored transparent window slider covers are individually and vertically slideable to individually open and close each of said windows in said array of windows such that only one of the two colored transparent window slider covers is used at any one time to close any one window in said array of windows for teaching basic mathematical calculations and concepts.

9. The combination of claim 8 wherein said first colored transparent window slider covers are formed from green transparent plastic having means for being manually and horizontally manipulated from either an open to a closed position or from the closed to the open position and wherein said second colored transparent window slider covers are formed from red transparent plastic having means for being manually and vertically manipulated from either an open to a closed position or from the closed to the open position.

10. The combination of claim 8 wherein an addition calculation of a first number to a second number is accomplished by closing a first colored transparent window slider cover for covering natural number one in row one column one and sequentially closing one of said first colored transparent window slider covers for each addition of one needed to obtain said first number with the exception of the last addition of one needed to obtain said first number and closing said one of said second colored transparent window slider covers for the last addition of one needed to obtain said first number and continuing to sequentially close one of said first colored transparent window slider covers for each counting of one needed to obtain said second number with the exception of the last addition of one needed to obtain said second number and closing said one of said second first colored transparent window slider cover for the last addition of one needed to obtain said second number such that the natural number transparently covered thereby provides the answer to the addition of said first and second numbers.

11. The combination of claim 8 wherein a subtraction calculation of a second smaller number from a first larger number is accomplished by closing a first colored transparent window slider cover for covering natural number one in row one column one and sequentially closing one of said first colored transparent window slider covers for each addition of one needed to obtain said first larger number with the exception of the last addition of one needed to obtain said first larger number and closing said one of said second colored transparent window slider covers for the last addition of one needed to obtain said first larger number and working backwards by sequentially opening one of said closed first colored transparent window slider covers for each addition of one needed to obtain said second smaller number starting with an opening of said one of said closed second colored transparent window slider covers and working backwards such that that the transparently covered natural number immediately after the last opened window reveals the answer to the subtraction calculation of said second smaller number from said first larger number.

12. The combination of claim 8 wherein a multiplication calculation of a first natural number by a second natural number is accomplished by closing a first colored transparent window slider cover for covering natural number one in row one column one and sequentially closing one of said first colored transparent window slider covers for each addition of one needed to obtain said first natural number with the exception of the last addition of one needed to obtain said first natural number and closing said one of said second first colored transparent window slider covers for the last addition of one needed to obtain said first natural number and repeating this process of closing consecutive windows a number of times equal to said second natural number such that that the transparently covered natural number displayed through the last closed window reveals the answer to the multiplication calculation of said first natural number by said second natural number.

13. The combination of claim 8 wherein a division calculation of a first larger number by a second smaller number is accomplished by closing a second colored transparent window slider cover for covering the natural number representing the first larger number and then closing a first colored transparent window slider cover covering natural number one in row one column one and sequentially closing one of said first colored transparent window slider covers for each addition of one needed to obtain said second smaller number with the exception of the last addition of one needed to obtain said second smaller number and closing said one of said second colored transparent window slider covers for the last addition of one needed to obtain said second smaller number and repeating this process on consecutive windows without a group of ones in said second smaller number going beyond said second colored transparent window slider cover covering the first larger number and then counting the number of said second colored transparent window slider covers which have been closed without going beyond said second colored transparent window slider cover covering the natural number representing the first larger number and then obtaining any remainder by counting windows needed to go from a last closed second colored transparent window slider cover to said second colored transparent window slider cover covering the first larger number and by counting the said second colored transparent window slider cover covering the first larger number.

14. A teaching method, said method comprising the steps:
   providing a first substantially planar member having thereon a series of consecutive natural numbers arranged in a number array comprised of ten rows and ten columns consecutively numbered with natural numbers one through one hundred starting with natural number one in row one column one;
   providing a second member superimposed on said first member and including an array of windows registering with said series of consecutive natural numbers such that each of said windows in said array of windows has one of said consecutive natural numbers displayed therethrough;
   providing a first array of first colored transparent window slider covers horizontally slideably engaged relative to said first and second members such that each of said first colored transparent window slider covers are individually and horizontally slideable to individually open and close each of said windows in said array of windows;
   providing a second array of second colored transparent window slider covers vertically slideably engaged between said first and second members such that each of said second colored transparent window slider covers are individually and vertically slideable to individually open and close each of said windows in said array of windows; and
   sliding only one of the two colored transparent window slider covers at any one time to close any one window in said array of windows for teaching basic mathematical calculations and concepts.

* * * * *